United States Patent
Park et al.

(10) Patent No.: US 7,555,555 B2
(45) Date of Patent: Jun. 30, 2009

(54) SIP-BASED MULTIMEDIA COMMUNICATION SYSTEM CAPABLE OF PROVIDING MOBILITY USING LIFELONG NUMBER AND MOBILITY PROVIDING METHOD

(75) Inventors: Hyun-Seo Park, Daejeon (KR);
Sook-Yang Kang, Daejeon (KR);
Kyung-Sook Kim, Daejeon (KR);
Young-Jick Bahg, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 1235 days.

(21) Appl. No.: 10/942,368

(22) Filed: Sep. 15, 2004

(65) Prior Publication Data

US 2005/0125543 A1    Jun. 9, 2005

(30) Foreign Application Priority Data

Dec. 3, 2003    (KR) .............. 10-2003-0087142

(51) Int. Cl.
*G06F 13/00* (2006.01)
(52) U.S. Cl. ............... 709/227; 709/225; 709/238; 709/250
(58) Field of Classification Search ........... 709/217, 709/219, 223, 225, 227, 229, 238, 250
See application file for complete search history.

(56) References Cited

U.S. PATENT DOCUMENTS 6,988,143 B2 * 1/2006 O'Neill et al. ............ 709/230

2003/0137991 A1 * 7/2003 Doshi et al. ............ 370/466
2004/0122976 A1 * 6/2004 Dutta et al. ............ 709/245
2004/0229608 A1 * 11/2004 Isukapalli et al. ........ 455/432.1

FOREIGN PATENT DOCUMENTS

KR    1020010081927    8/2001
KR    1020030035442 A    5/2003

OTHER PUBLICATIONS

Mobile Computing and Communications Review, vol. 1, No. 2, pp. 1-9.
"Application-Layer Mobility Using SIP", H. Schulzzinne, et al., Service Portability and Virtual Customer Environments, 2000 IEEE, pp. 29-36.

* cited by examiner

*Primary Examiner*—Viet Vu
(74) *Attorney, Agent, or Firm*—Blakely, Sokoloff, Taylor & Zafman LLP

(57) ABSTRACT

The SIP-based multimedia communication system for providing mobility using lifelong numbers provides mobility through SIP network service domains and a global domain. The SIP network service domain comprises a user agent and an SIP network server. The user agent transmits request/response messages between users to set up, correct, and cancel calls, and when contact information of the user agent is registered and registration of the contact information is cancelled, requests to be informed of state changes in registration information. The SIP network server performs message routing between user agents and informs the contact information of the user agents during message routing. The global domain manages the SIP network service domains and allocates global SIP identifiers, that is, lifelong numbers to users to provide user-centered mobility.

20 Claims, 6 Drawing Sheets

SIP-BASED MULTIMEDIA COMMUNICATION SYSTEM CAPABLE OF PROVIDING MOBILITY USING LIFELONG NUMBER AND MOBILITY PROVIDING METHOD

CROSS REFERENCE TO RELATED APPLICATION

This application claims priority to and the benefit of Korea Patent Application No. 2003-87142 filed on Dec. 3, 2003 in the Korean Intellectual Property Office, the entire content of which is incorporated herein by reference.

BACKGROUND OF THE INVENTION (a) Field of the Invention

The present invention relates to a multimedia communication system based on session initiation protocol (SIP). More specifically, the present invention relates to an SIP-based multimedia communication system for effectively providing mobility using a lifelong number and a mobility providing method.

(b) Description of the Related Art

The development of wired and wireless communication networks and people's desires for communications that can be used at any time and place are making a service environment where various communication networks coexist in an arbitrary place. A user can use different service networks depending on circumstances including the place where the user wants to carry out communication, the user's moving speed, the kind of information the user wants to use, communication performance the user desires, communication cost, and so on. Furthermore, terminals used for communication have various forms, and the choice of a terminal may affect the choice of a communication network.

The communication service user wants to use available communication service using various kinds of devices irrespective of place. For instance, the user may want to continuously watch VOD (Video On Demand) he/she has been watching in the living room, kitchen, or other rooms using a device placed in one of the rooms. For this, the SIP-based multimedia service provides consistent services to the user when the user wants to use an SIP uniform resource identifier of the user irrespective of the user's physical position and terminal. Mobility provided by an SIP-based multimedia communication system includes personal mobility, service mobility, session mobility, and terminal mobility.

In the meantime, SIP WG and SIP Proposal investigation (SIPPING) WG of IETF (Internet Engineering Task Force), an Internet protocol standardization organization, are carrying out standardization for providing personal mobility using SIP forking, service mobility according to a method of maintaining call control commands system-independently by registering a terminal capability or preference in an SIP register or using a call processing language (CPL), session mobility using third party call control or SIP REFER message, and terminal mobility using an SIP Re-INVITE message.

FIG. 1 shows a conventional personal mobility providing method in an SIP network service domain. Referring to FIG. 1, a communication peer who wants to make a multimedia communication with Alice requests a call setup targeting the SIP identifier of Alice. Here, it is assumed that Alice has alice@adsl.home.net 11 and alice@wlan.home.net 12 as her SIP identifier.

When the communication peer requests call setup targeting the SIP identifier alice@adsl.home.net 11, an SIP network server 13 of the adsl.home.net domain transmits a call to a physical SIP user agent currently registered as alice@adsl.home.net 11 through forking. Since there are two physical SIP user agents, tel:82421238282 15 and alice@host.home2.net 17, which are currently registered as alice@adsl.home.net 11, the call can be transmitted to these two SIP user agents 15 and 17.

When the communication peer requests call setup targeting the SIP identifier alice@wlan.home.net 12, an SIP network server 14 of wlan.home.net domain transmits the call to a physical SIP user agents registered as alice@wlan.home.net 12 through forking. Since there are three SIP user agents currently registered as alice@wlan.home.net 12, tel:82421238282 15, alice@laptop.home1.net 16 and tel:82161231004 18, the call can be transmitted to these three SIP user agents 15, 16 and 18.

In this manner, when a user attempts to set up a call targeting a peer's SIP identifier, the call is transmitted to a physical SIP user agent where the peer is currently located through the forking function of the SIP network server irrespective of the terminal at which the user is located. Accordingly, personal mobility in the SIP network using the forking function is provided.

In the meantime, a service profile is managed independently of terminals, and the SIP service is provided to the user based on the profile when the user uses the SIP service such that the user can be provided with the same service irrespective of the terminal at which the user is located. The service profile can include speed dials, a buddy list, media priorities, bell sounds, voice mail setup, and so on. Furthermore, call control commands are managed independently of terminals using a call processing language so that call control can be carried out in an integrated manner. In doing so, service mobility in the SIP network is provided.

Moreover, a user can continue a session in operation while changing a terminal, or another user can continue the session. Session mobility in the SIP network can be provided by using the third party call control or an SIP REFER message.

FIG. 2 shows a conventional session mobility providing method using an SIP REFER message. Referring to FIG. 2, when Alice 21 and Bob1 22 are carrying out multimedia communication between them, Bob1 22 moves a session to Bob2 23. Bob1 22 transmits the SIP REFER message 24 to Bob2 23 to request Bob2 to start a new call with Alice 21. Bob2 23 who has received the SIP REFER message 24 transmits an SIP INVITE message 25 to Alice 21 to request a new call setup. The SIP INVITE message 25 includes a request that makes Alice 21 complete the previous call set up between Alice 21 and Bob1 22 when the new call setup is accomplished.

When the new call setup between Alice 21 and Bob2 23 is accomplished, Alice 21 transmits an SIP BYE message 26 to Bob1 22 to finish the previous call set up between Alice 21 and Bob1 22.

In this manner, a user can continue a session in progress while changing a terminal, or another user can continue the session. Accordingly, session mobility in the SIP network can be provided.

Furthermore, it is possible to maintain a session and continue communication even if a terminal the user is currently using is moved between IP subnets. When the terminal is moved, the SIP informs the registrar of the terminal of a new IP address using the SIP REGISTER message. When the session is in operation, the SIP can inform a communication peer that the IP address has been changed using the SIP Re-INVITE message. In this manner, terminal mobility in the SIP network is provided.

FIG. 3 shows a conventional terminal mobility providing method using the SIP Re-INVITE message. Referring to FIG. 3, when Bob 32 is located in a home network, he transmits the SIP INVITE message 34 to Alice 31 to set up a multimedia call between Bob 32 and Alice 31. Here, it may happen that Bob 32, located in the home network, moves to a foreign network 35. Bob 33 who has moved to the foreign network can transmit the SIP Re-INVITE message 36 to Alice 31 to inform her that his IP address has been changed and continue a session.

While the above-described conventional techniques sufficiently consider mobility based on a logical SIP identifier allocated to a user, they barely consider user-centered mobility. The user is provided with services of various SIP network service providers. Accordingly, mobility cannot be provided due to the aforementioned problem when there are various different SIP network service providers.

In the case that an ADSL network operator and a WLAN network operator respectively provide SIP network services, for example, SIP identifiers provided by these two operators become logical identifiers independent of each other, as shown in FIG. 1.

In the case of personal mobility, a user is provided with personal mobility respectively for the two SIP identifiers so that a communication peer should distinguish the two SIP identifiers from each other. Furthermore, even when the forking function of the SIP network server is used, a call to all physical positions of a single user may not be set up.

In the case of service mobility, since a user is provided with service mobility respectively for the two SIP identifiers, different services may be provided to the user when the user moves between SIP network services.

There is no serious problem with session mobility because it is independent of logical SIP identifiers. However, there is a restriction on the session mobility that a terminal that attempts to move a session must be ready for receiving SIP messages all the time. Practically, a user is moved and then executes SIP service registration so that the session mobility cannot be provided.

Terminal mobility is not problematical because it is independent of the logical SIP identifiers. However, most terminals do not support multi-homing so that media packets of a session in operation may be lost while IPs are changed with each other. Furthermore, a communication peer should be informed of a terminal change.

SUMMARY OF THE INVENTION

It is an advantage of the present invention to provide an SIP-based multimedia communication system capable of providing mobility using a lifelong number, which offers a user-centered mobility providing method to provide integrated mobility including all SIP identifiers to a user even when the user is provided with various logical SIP identifiers from various SIP network service providers.

In an aspect of the present invention, an SIP-based multimedia communication system comprises SIP network service domains that provide mobility based on a logical SIP identifier allocated to each of users, and a global domain that integratively manages the SIP network service domains and allocates a global SIP identifier that is a lifelong number to each user to provide user-centered mobility. Each of the SIP network service domain includes a user agent that transmits request/response messages between users to set up, correct, and cancel a call, and when contact information of the user agent is registered and registration of the contact information is cancelled, requests to be informed of a state change in registration information, and an SIP network server that carries out message routing between user agents and informs the contact information of the user agents during message routing.

The global domain includes an SIP network server that maps the global SIP identifier with logical SIP identifiers in each of the SIP network service domains, which have been registered corresponding to the global SIP identifier, to provide the user-centered mobility.

The user agent constructs an SIP message targeting the global SIP identifier of a communication peer.

The SIP network server of the global domain determines a routing path of an SIP message, which is constructed targeting the global SIP identifier, to various feature servers included in the global domain according to a user profile of the global SIP identifier.

The SIP network server of the global domain maps the SIP message, constructed targeting the global SIP identifier, with logical SIP identifiers registered as the global SIP identifier and transmits the SIP message to the SIP network server of each of the SIP network service domains respectively providing the mapped logical SIP identifiers, to thereby provide personal mobility.

The global domain stores the user profile of the global SIP identifier to allow the user to be provided with the same service irrespective of the location of the user (here, the location of the user means one of the SIP network service domains and a user agent included in the SIP network service domain), to thereby provide service mobility.

The various feature servers include a park server that temporarily stores call information on a session when the session is moved.

The various feature servers include a B2BUA that intervenes in a session between two users when a terminal is moved to carry out call control and media relay.

In another aspect of the present invention, a mobility-providing method in an SIP-based multimedia communication system, which includes SIP network service domains including user agents and providing mobility based on a logical SIP identifier allocated to each user, and a global domain integratively managing the SIP network service domains and allocating an global SIP identifier to each user to provide user-centered mobility, comprises: a) an SIP network server of the global domain receiving an SIP message for SIP-based multimedia communication; b) mapping global SIP identifier of a communication peer to registered logical SIP identifiers, which is included in the received SIP message; and c) transmitting the received SIP message to an SIP network server of the SIP network service domains corresponding to the mapped logical SIP identifiers.

Here, b) comprises i) determining whether the communication peer is a subscriber of the global service using the global SIP identifier; ii) determining whether a call feature server is set up in a user profile of the user when the communication peer is determined to be the subscriber; iii) transmitting the received SIP message to the call feature server when it is determined that the call feature server is set up in the user profile; and iv) mapping global SIP identifier of a communication peer to registered logical SIP identifiers when it is determined that the call feature server is not set up in the user profile.

Furthermore, iv) comprises (a) determining whether the SIP network server of the global domain can carry out parallel forking; (b) selecting an optimal logical SIP identifier from the logical SIP identifiers registered as the global SIP identifier when it is determined that the SIP network server cannot carry out parallel forking; and (c) mapping global SIP identifier of a communication peer to registered logical SIP identifiers when the SIP network server can carry out parallel forking or the optimal SIP identifier is selected.

Moreover, (b) selects the optimal logical SIP identifier in consideration of information including priority, the kind of media, the kind of call, and time on the basis of the user profile.

When registration of the selected optimal logical SIP identifier is expired, (b) is repeated until a logical SIP identifier registered as the global SIP identifier is selected The global domain includes a park server that temporarily stores call information on a session when the session is moved, and the mobility providing method comprises: i) a second user agent between first and second user agents that execute a), b), and c) to provide a multimedia call session transmitting an SIP PUBLISH message to the park server in order to move the session to a third user agent; ii) the third user agent transmitting an SIP SUBSCRIBE message to the park server to request information on a call of the second user agent, which is parked in the park server, and the park server transmitting an SIP NOTIFY message to the third user agent to deliver the information on the call; iii) the third user agent transmitting an SIP INVITE to the first user agent to set up a new call; and iv) the third user agent and the first user agent continuing the parked session.

The global domain includes a B2BUA that intervenes in a session between two users when a terminal is moved to carry out call control and media relay, and the method comprises: i) a first user agent located in a home network executing a multimedia call session with a second user agent through the B2BUA; ii) transmitting an SIP Re-INVITE to the B2BUA when the first user agent is moved to a foreign network; iii) the B2BUA re-setting up a media route to the first user agent located in the foreign network; and iv) the B2BUA continuing the session between the first and second user agents.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
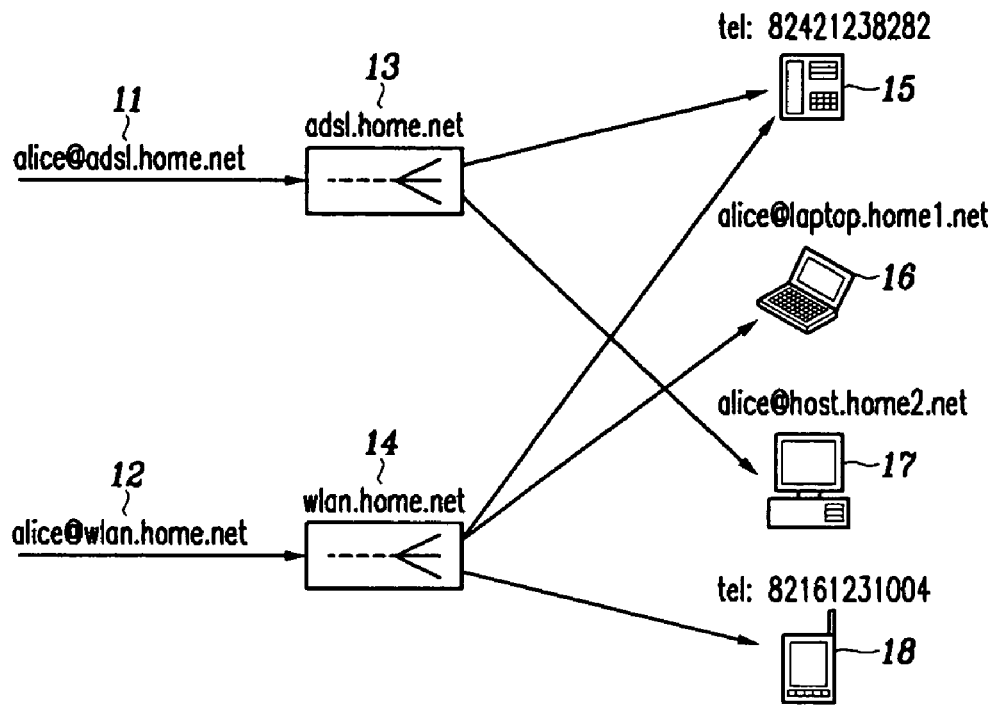
FIG. 1 shows a conventional personal mobility providing method in an SIP network service domain.
Figure 2:
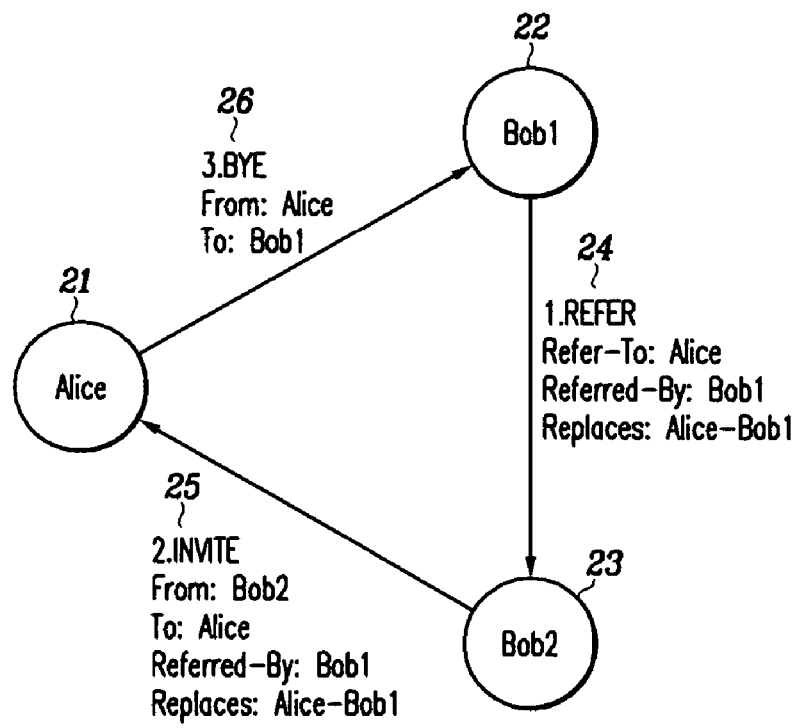
FIG. 2 shows a conventional session mobility providing method using the SIP REFER message.
Figure 3:
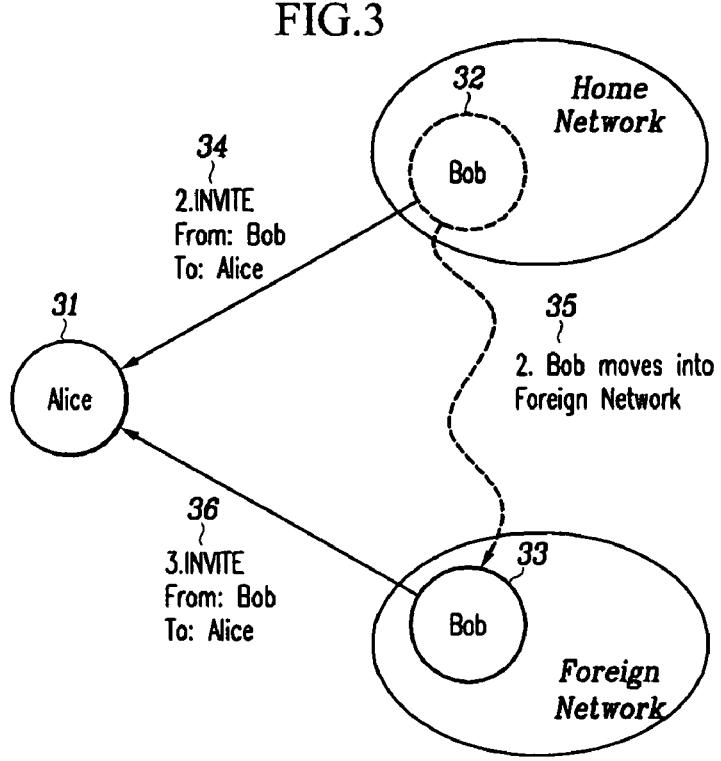
FIG. 3 shows a conventional terminal mobility providing method using the SIP Re-INVITE message.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 4:
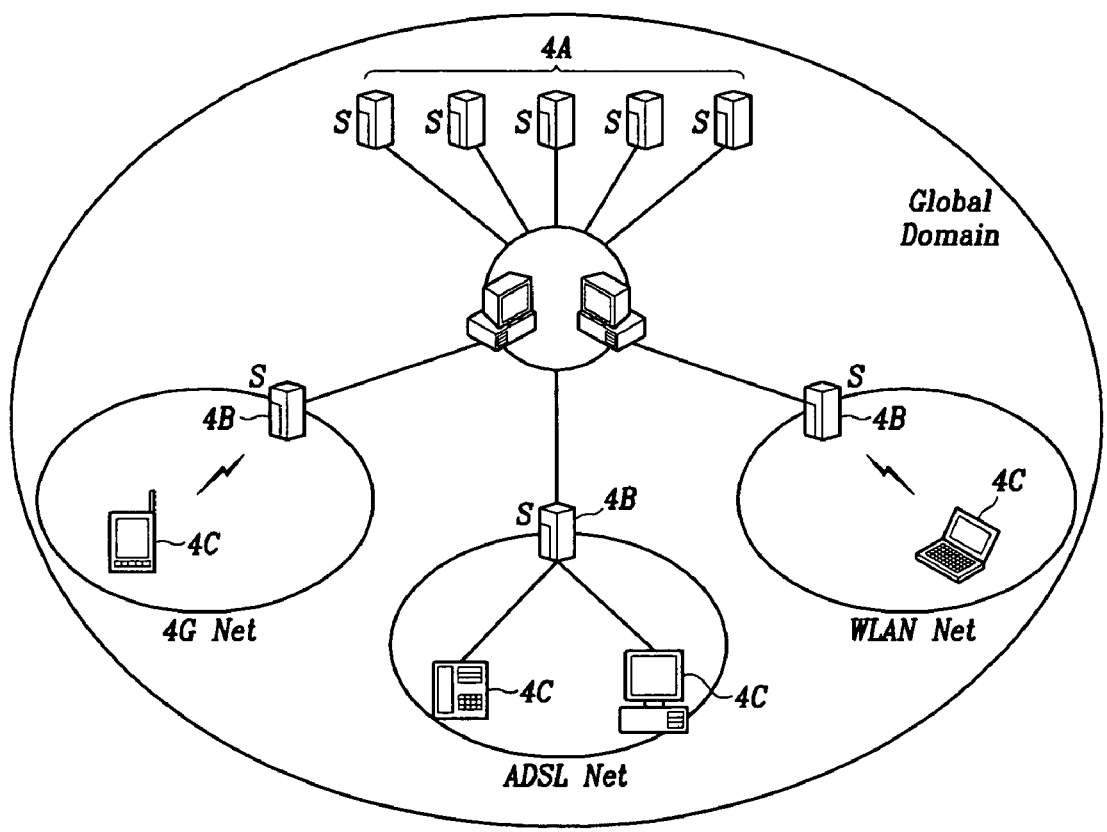
FIG. 4 shows an SIP-based multimedia communication system according to an embodiment of the present invention.

FIG. 4 shows an SIP-based multimedia communication system according to an embodiment of the present invention. As shown in FIG. 4, the SIP-based multimedia communication system according to the present invention includes a global domain that integrates SIP network service providing domains (4G Net, ADSL Net, WLAN net, and so on) to provide user-centered mobility.

In the global domain, a user is allocated a global SIP identifier independent of SIP network service. The SIP identifier identifies the user through all his/her life like a lifelong number or a lifelong telephone number. Accordingly, a communication peer can communicate with the user using the SIP identifier all the time even when the user changes the SIP-network service or physical terminal he/she uses.

The global domain has a variety of SIP call control related servers 4A including an SIP network server, a park server, a presence server, a B2BUA server, a call feature server, a call processing language (CPL) server, and so on. These call control related servers perform call control targeting a global SIP identifier that is a lifelong number.

The global domain provides user-centered mobility on the basis of the global SIP uniform resource identifier (URI). The global SIP identifier is mapped with logical SIP identifiers in currently registered SIP network service domains 4G Net, ADSL Net, and WLAN Net. This mapping is carried out by the SIP network server included in the global domain. The logical SIP identifiers are mapped with user agents 4C that are actual physical locations of the user through the SIP network servers 4B of respective SIP network service domains 4G Net, ADSL Net, and WLAN Net. Here, the SIP network service domains 4G Net, ADSL Net and WLAN Net provide logical address-centered mobility based on the logical SIP URI according to a prior art.

Figure 5:
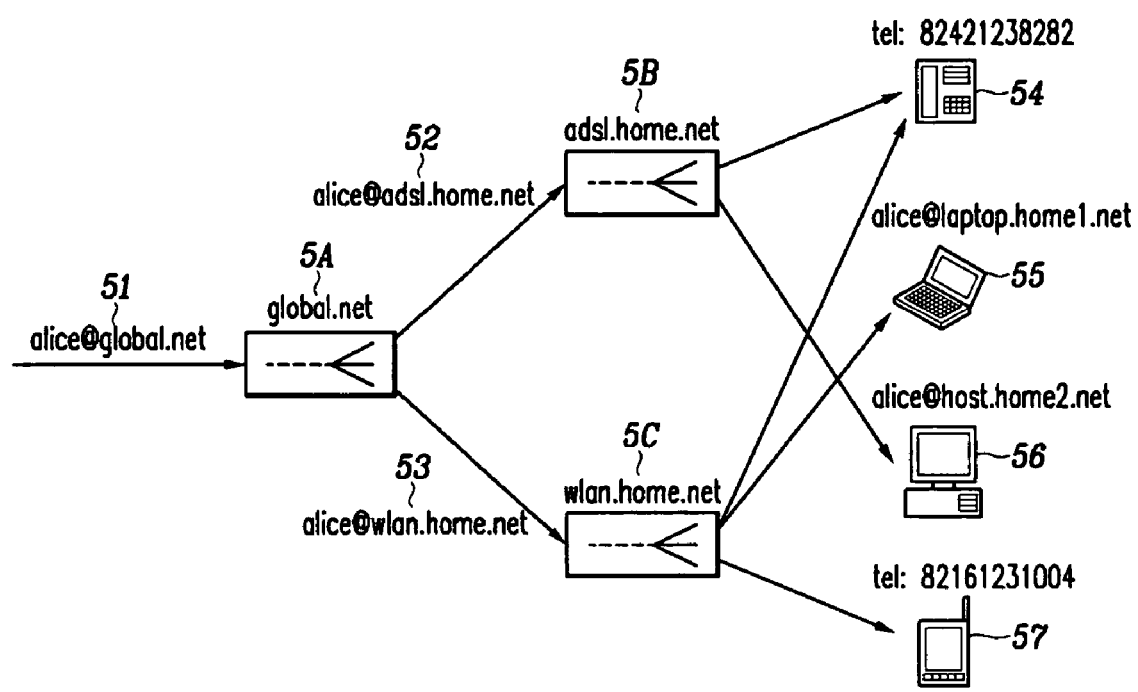
FIG. 5 shows a personal mobility providing method in the SIP-based multimedia communication system according to an embodiment of the present invention.

FIG. 5 shows a personal mobility providing method in the SIP-based multimedia communication system according to an embodiment of the present invention. Referring to FIG. 5, a communication peer attempts to set up a call targeting Alice's global SIP identifier that is her lifelong number. The peer can set up an optimal communication route irrespective of the SIP network service and terminal Alice uses only if the peer knows Alice's SIP identifier, alice@global.net 51.

When the peer requests call setup targeting Alice's SIP identifier, alice@global.net 51, the SIP network server 5A of the global domain obtains logical SIP identifiers currently registered as alice@global.net through forking. The logical SIP identifiers include alice@adsl.home.net 52 and alice@wlan.home.net 53.

Accordingly, the SIP network server 5A of the global domain requests call setup targeting alice@adsl.home.net 52 and alice@wlan.home.net 53, respectively. The SIP network server 5A requests call setup respectively for the two SIP identifiers if parallel forking is set up in the global domain, and requests call setup for one of them if parallel forking is not set up.

Then, an SIP network server 5B of adsl.home.net domain transmits a call to physical SIP user agents currently registered as alice@adsl.home.net 52 through forking. Since there are two SIP user agents currently registered as alice@adsl.home.net 52, tel:82421238282 54 and alice@host.home2.net 56, the call can be respectively transmitted to these two SIP user agents.

For alice@wlan.home.net 53, an SIP network server 5C of wlan.home.net domain transmits a call to physical SIP user agents currently registered as alice@wlan.home.net 53 through forking. Since there are three SIP user agents currently registered as alice@wlan.home.net 52, tel:82421238282 54, alice@laptop.home1.net 55 and tel:82161231005 57, the call can be respectively transmitted to these three SIP user agents.

In this manner, improved personal mobility can be provided. While call setup can be carried out only when the communication peer knows the logical SIP identifier allocated to the user in the prior art, the peer can be provided with an optimal communication state irrespective of the SIP network service or terminal the user uses if the peer knows the user's global SIP identifier that is his/her lifelong number in the present invention.

Figure 6:
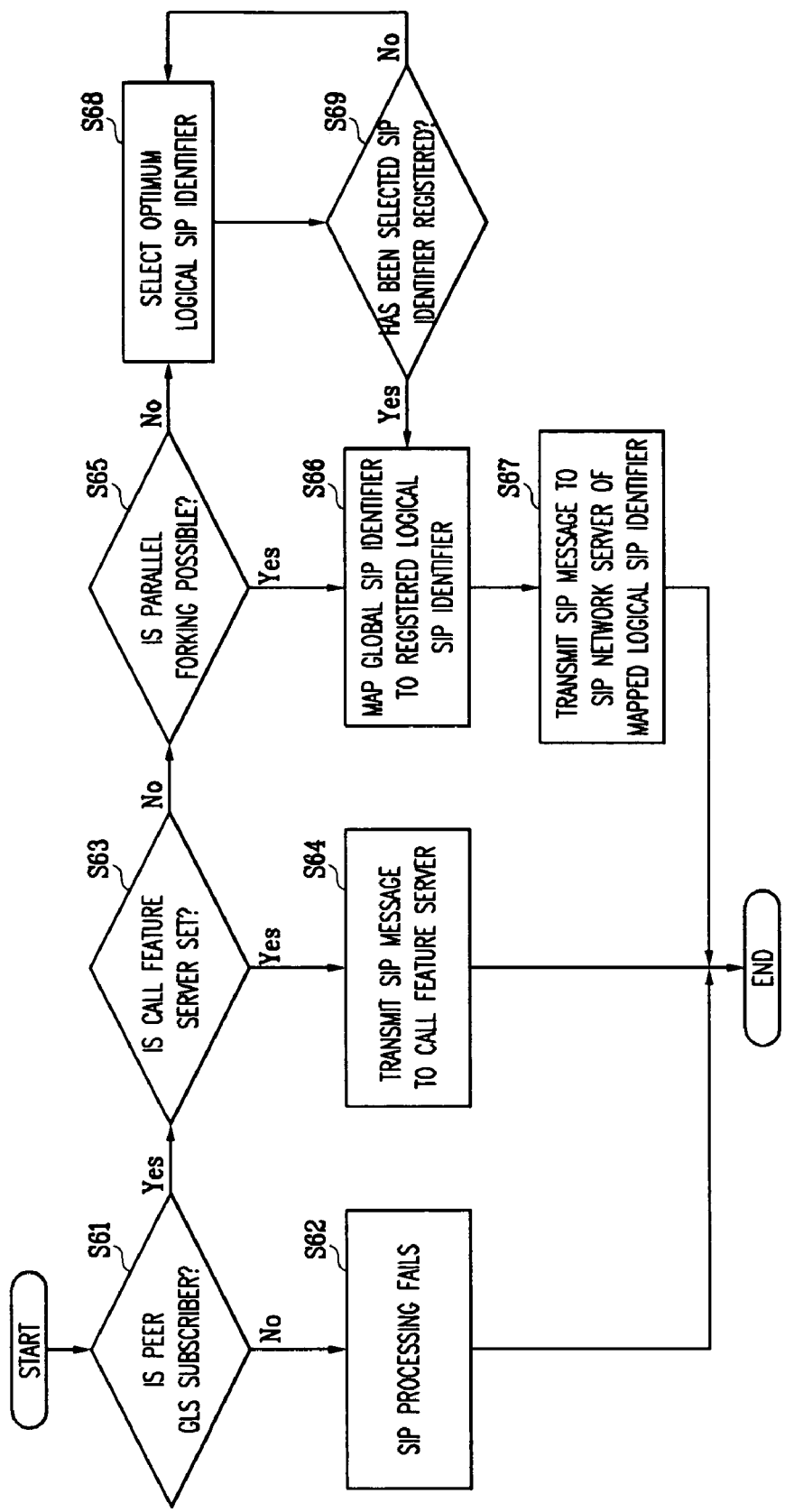
FIG. 6 shows an SIP request message processing procedure in an SIP network server included in a global domain for providing personal mobility in the SIP-based multimedia communication system according to an embodiment of the present invention.

FIG. 6 shows an SIP request message processing procedure in an SIP network server 5A included in the global domain for providing personal mobility in the SIP-based multimedia communication system according to an embodiment of the present invention.

Referring to FIG. 6, when the SIP network server 5A included in the global domain receives an SIP message from a communication user, the SIP network server checks whether a peer, that is, the destination of the message, is a user who has subscribed for global service (GLS) in step S61. If the peer is not a subscriber, the SIP network server transmits an SIP 404 Not Found error response representing that the peer cannot be found, and SIP processing fails and finishes the SIP message processing in step S62.

If the peer has subscribed for the global service, the SIP network server 5A checks a user profile to determine whether a call feature server is set up in step S63. If the call feature server is set up in the user profile, the SIP network server 5A transmits the received SIP message to the call feature server to allow the SIP message to be processed by the call feature server in step S64.

If the call feature server is not set up in the user profile and parallel forking is possible in step S65, the SIP network server maps the global SIP identifier to currently registered logical SIP identifiers in step S66 and transmits the SIP message to SIP network servers 5B and 5C providing SIP network services corresponding to the logical SIP identifiers in step S67.

When the parallel forking is impossible in the step S65, an optimal SIP identifier is selected from the logical SIP identifiers currently registered as the global SIP identifier in step S68. Here, the optimal SIP identifier is determined in consideration of priority, the kind of media, the kind of the call, and time on the basis of the user profile.

The SIP network server checks whether registration of the optimal SIP identifier has been expired in step S69. When registration of the optimal SIP identifier has been expired, steps S68 and S69 are repeated until a registered optimal SIP identifier is selected.

The selected optimal SIP identifier is mapped with the global SIP identifier in step S66 and the SIP message is transmitted to the SIP network servers 5B and 5C providing SIP network service, which correspond to the logical SIP identifiers in step S67.

In the meantime, the global domain manages a service profile independently of SIP service networks and terminals the user uses and provides the SIP network service to the user on the basis of the service profile when the user uses the SIP network service. Thus, the user can be provided with the same service irrespective of the SIP network service or terminal he/she uses. The service profile can include speed dials, a buddy list, media priorities, bell sounds, voice mail setup, and so on. Furthermore, the global domain can manage call control commands independently of terminals using a CPL to process call control in an integrated manner. By doing so, the service mobility is provided.

As described above, the global domain provides global SIP identifier level service mobility while the SIP network service domains 4G Net, ADSL Net, and WLAN Net provide logical SIP identifier level service mobility.

In the meantime, there is a restriction on the session mobility provided by the prior art such that a terminal that attempts to move a session should be registered for SIP service and be ready to receive SIP messages. Practically, a user is moved and then registered for the SIP service. In this case, the session mobility cannot be provided.

Figure 7:
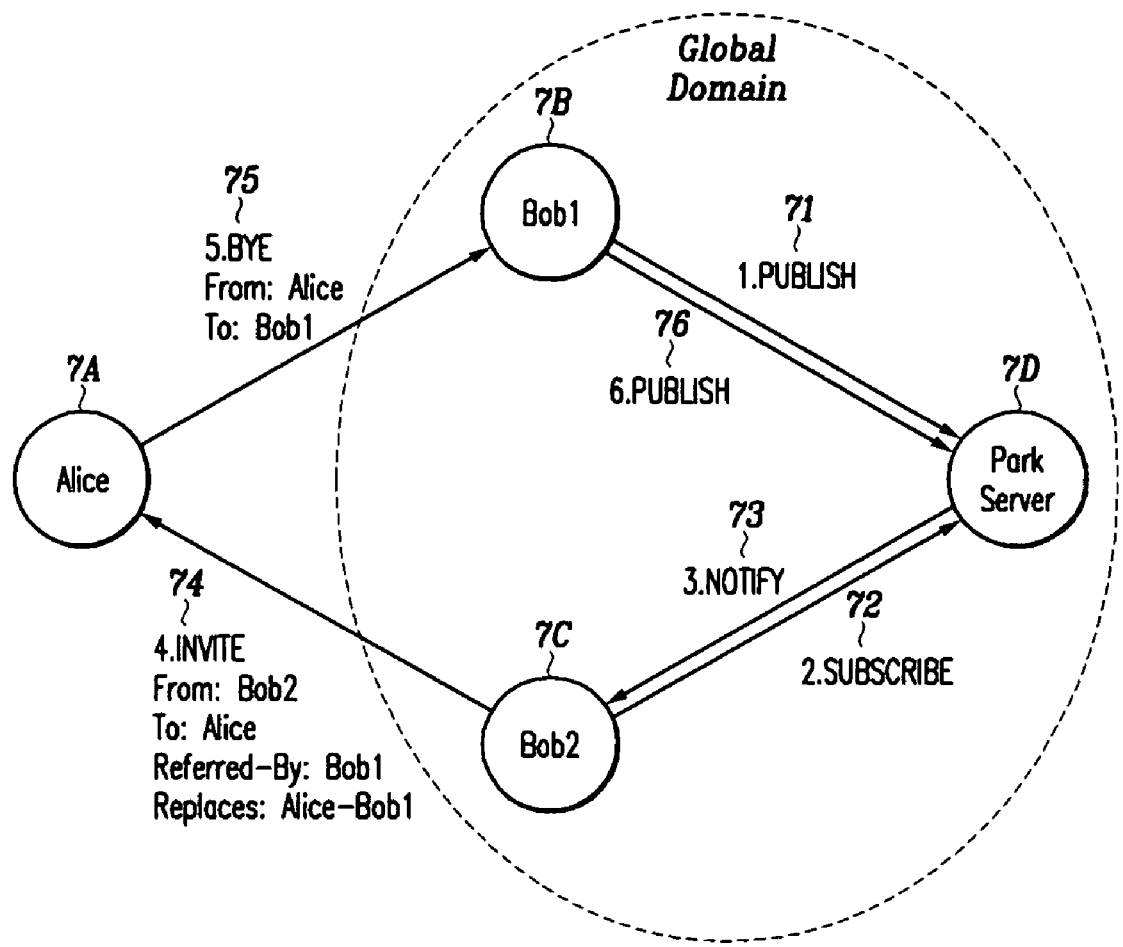
FIG. 7 shows a session mobility providing method through a park server of the global domain in the SIP-based multimedia communication system according to an embodiment of the present invention.

FIG. 7 shows a session mobility providing method through a park server of the global domain in the SIP-based multimedia communication system according to an embodiment of the present invention.

Referring to FIG. 7, a session is moved to Bob2 7C when Alice 7A and Bob1 are carrying out multimedia communication between them. First, Bob1 7B transmits an SIP PUBLISH message 71 including information on the session to a park server 7D in the global domain. The SIP PUBLISH message 71 includes information representing that the peer of the session is Alice 7A.

Bob2 7C to whom the session will be moved transmits an SIP SUBSCRIBE message 72 to the park server 7D to request information on the currently parked call of Bob1 7B. The park server 7D that has received the SIP SUBSCRIBE message 72 transmits an SIP NOTIFY message 73 to Bob 2 7c to inform him of the information on the parked call of Bob1 7B.

Accordingly, Bob2 7C can start a new call with Alice 7A on the basis of the information. For this, Bob2 7C transmits an SIP INVITE message 74 to Alice 7A to request a new call setup. This request includes contents that request Alice 7A to finish the previous call set up between Alice 7A and Bob1 7B. Accordingly, Alice 7A transmits an SIP BYE message 75 to Bob1 7B to finish the previous call set up between Alice 7A and Bob1 7B when the new call setup is completed.

In this manner, the session in operation can be continued while the terminal is changed with another one or another user can continue the session. Furthermore, the session can be moved to a terminal that is not registered for the SIP service and continued. Consequently, the session mobility is provided.

In the meantime, in the case of the terminal mobility provided by the prior art, most terminals do not support multi-homing so that media packets of a session in operation can be lost while IPs are changed. Furthermore, a communication peer should know terminal changes.

Figure 8:
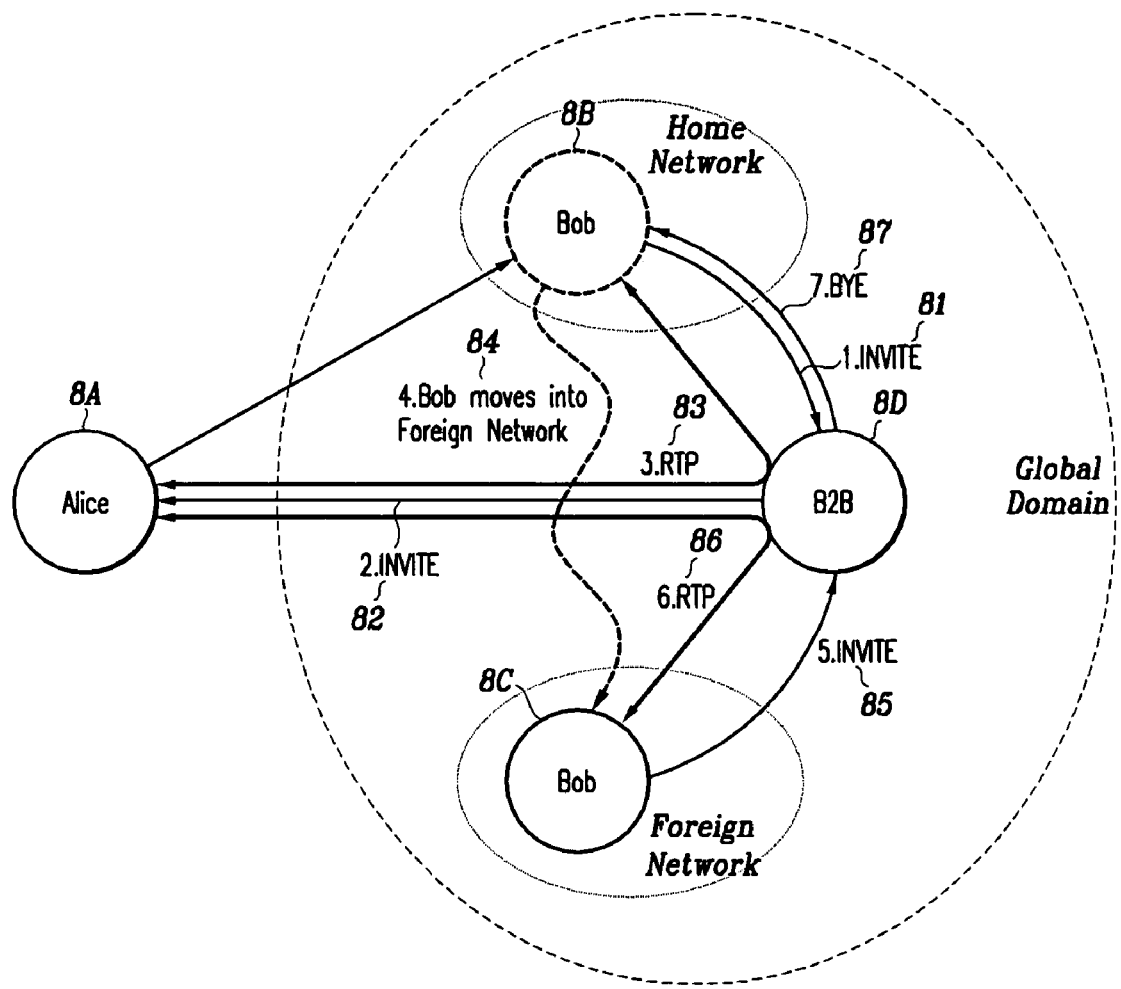
FIG. 8 shows a terminal mobility providing method through an SIP B2BUA (Back-to-Back User Agent) of the global domain in the SIP-based multimedia communication system according to an embodiment of the present invention.

FIG. 8 shows a terminal mobility providing method through an SIP B2BUA (Back-to-Back User Agent) of the global domain in the SIP-based multimedia communication system according to an embodiment of the present invention.

Referring to FIG. 8, Bob 8B, located in a home network, transmits an SIP INVITE message 81 to a B2BUA 8D included in the global domain in order to request Alice 8A to set up a multimedia call. The B2BUA 8D delivers the message received from Bob 8B to Alice 8A who is the actual communication peer (82). When the multimedia call setup between Bob 8B and Alice 8A is completed, Bob 8B transmits media to the B2BUA 8D, and the media is delivered to Alice 8A. Alice 8A transmits media to the B2BUA 8D and the media is sent to Bob 8B again (83). That is, Alice 8A and Bob 8B transmit and receive audio or video media using RTP (Real-Time Transport Protocol). Accordingly, the B2BUA 8D performs session control and media relay between the two communication objects 8A and 8B.

Here, it may happen that Bob 8B, located in the home network, is moved to a foreign network (84). Bob 8C who has moved to the foreign network transmits an SIP Re-INVITE message 85 to the B2BUA 8D in order to inform Alice 8A that his address has been changed. At this time, the B2BUA 8D can only re-set up a media route without transmitting the message received from Bob 8C to Alice 8A when media are not newly added or reduced. Accordingly, the session with Alice 8A can be continued when only the media route between Bob 8C and the B2BUA 8D is re-set up (86). In addition, the B2BUA 8D transmits an SIP BYE message 87 to Bob 8B to delete the media route between Bob 8B and the B2BUA 8D after the session is moved to Bob 8C.

As described above, the terminal mobility can be provided using the B2BUA 8D even when the peer is not informed of a terminal change. Furthermore, media lost while the session is moved can be reduced to a minimum. Moreover, there is no need to re-set up a session when communication objects have different CODECs.

As described above, the present invention can provide integrated mobility including all SIP identifiers to a user even when the user is allocated a plurality of logical SIP identifiers from a plurality of SIP network service providers and uses them.

Furthermore, the SIP-based multimedia communication system of the present invention has a two-level mobility hierarchy structure such that the global domain that is the upper level provides user-centered mobility based on a global SIP URI, and the SIP network service domain that is the lower level provides logical address-based mobility based on a logical SIP URI. Moreover, improved mobility can be provided by adding various functions required for providing mobility to the global domain.

Furthermore, in the case of personal mobility, an optimal communication route can be set up irrespective of the SIP network service and terminal a user uses if a communication peer knows only the user's global SIP identifier that is his/her lifelong number. Accordingly, even when the user's logical SIP identifier is changed, the peer need not know this fact.

Moreover, in the case of service mobility, a service profile is managed independently of SIP service networks and terminals, and services are provided to a user on the basis of the service profile. Thus, the user can be provided with the same service irrespective of the SIP network service and terminal the user uses in the global domain. In addition, SIP network service domains can provide service mobility at a logical SIP identifier level.

In the case of session mobility, a session in operation can be continued while a terminal used for the session is changed or the session can be continued by another user. In addition, the session can be moved to a terminal that has not subscribed for the SIP service and continued.

Moreover, the terminal mobility can be provided even when a communication peer is not informed that a terminal is moved. Furthermore, media lost while the terminal is moving can be reduced to a minimum. Moreover, there is no need to re-set up a session when communication objects use different media CODECs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An SIP (Session Initiation Protocol)-based multimedia communication system, comprising
    SIP network service domains that provide mobility based on a logical SIP identifier allocated to each of users, and
    a global domain that integratively manages the SIP network service domains and allocates a global SIP identifier that is a lifelong number to each user to provide user-centered mobility,
    wherein each of the SIP network service domain comprises:
    a user agent that transmits request/response messages between users to set up, correct, and cancel a call, and when contact information of the user agent is registered and registration of the contact information is cancelled, requests to be informed of a state change in registration information; and
    an SIP network server that carries out message routing between user agents and informs of the contact information of the user agents during message routing.

2. The SIP-based multimedia communication system as claimed in claim 1, wherein the global domain includes an SIP network server that maps the global SIP identifier with logical SIP identifiers in each of the SIP network service domains, which have been registered corresponding to the global SIP identifier, to provide the user-centered mobility.

3. The SIP-based multimedia communication system as claimed in claim 1, wherein the SIP network server of each of the SIP network service domains maps the logical SIP identifiers on user agents that are practical physical locations of each user.

4. The SIP-based multimedia communication system as claimed in claim 2, wherein the user agent constructs an SIP message targeting the global SIP identifier which is a lifelong number of a communication peer.

5. The SIP-based multimedia communication system as claimed in claim 4, wherein the SIP network server of the global domain determines a routing path of an SIP message, which is constructed targeting the global SIP identifier, to various feature servers included in the global domain according to a user profile of the global SIP identifier.

6. The SIP-based multimedia communication system as claimed in claim 4, wherein the SIP network server of the global domain maps the SIP message, constructed targeting the global SIP identifier, on logical SIP identifiers registered as the global SIP identifier, and transmits the SIP message to the SIP network server of each of the SIP network service domains respectively providing the mapped logical SIP identifiers, to thereby provide personal mobility.

7. The SIP-based multimedia communication system as claimed in claim 5, wherein the global domain stores the user profile of the global SIP identifier to allow the user to be provided with the same service irrespective of the location of the user (here, the location of the user means one of the SIP network service domains and a user agent included in the SIP network service domain), to thereby provide service mobility.

8. The SIP-based multimedia communication system as claimed in claim 5, wherein the various feature servers include a park server that temporarily stores call information on a session when the session is moved.

9. The SIP-based multimedia communication system as claimed in claim 5, wherein the various feature servers include a B2BUA (back-to-back user agent) that intervenes in a session between two users when a terminal is moved to carry out call control and media relay.

10. A mobility providing method in an SIP-based multimedia communication system that includes SIP network service domains including user agents and providing mobility based on a logical SIP identifier allocated to each user, and a global domain integratively managing the SIP network service domains and allocating a global SIP identifier to each user to provide user-centered mobility, comprising:
  a) an SIP network server of the global domain receiving an SIP message for SIP-based multimedia communication;
  b) mapping global SIP identifier of a communication peer to registered logical SIP identifiers, which is included in the received SIP message; and
  c) transmitting the received SIP message to an SIP network server of the SIP network service domains corresponding to the mapped logical SIP identifiers.

11. The mobility providing method in an SIP multimedia communication system as claimed in claim 10, wherein b) comprises:
  i) determining whether the communication peer is a subscriber of the global service using the global SIP identifier;
  ii) determining whether a call feature server is set up in a user profile of the user when the communication peer is determined to be the subscriber;
  iii) transmitting the received SIP message to the call feature server when it is determined that the call feature server is set up in the user profile; and
  iv) mapping the global SIP identifier to logical SIP identifiers when it is determined that the call feature server is not set up in the user profile.

12. The mobility providing method in an SIP multimedia communication system as claimed in claim 11, wherein iv) comprises:
  (a) determining whether the SIP network server of the global domain can carry out parallel forking;
  (b) selecting an optimal logical SIP identifier from the logical SIP identifiers registered as the global SIP identifier when it is determined that the SIP network server cannot carry out parallel forking; and
  (c) mapping the global SIP identifier to logical SIP identifiers when the SIP network server can carry out parallel forking or the optimal SIP identifier is selected.

13. The mobility providing method in an SIP multimedia communication system as claimed in claim 12, wherein (b) comprises selecting the optimal logical SIP identifier in consideration of information including the priority, the kind of media, the kind of call, and time, on the basis of the user profile.

14. The mobility providing method in an SIP multimedia communication system as claimed in claim 12, wherein (b) is repeated until a logical SIP identifier registered as the global SIP identifier is selected when registration of the selected optimal logical SIP identifier is expired.

15. The mobility providing method in an SIP multimedia communication system as claimed in claim 10, wherein the global domain includes a park server that temporarily stores call information on a session when the session is moved, and the method comprises:
  i) a second user agent between first and second user agents that execute a), b), and c) to provide a multimedia call session transmitting an SIP PUBLISH message to the park server in order to move the session to a third user agent;
  ii) the third user agent transmitting an SIP SUBSCRIBE message to the park server to request information on a call of the second user agent, which is parked in the park server, and the park server transmitting an SIP NOTIFY message to the third user agent to deliver the information on the call;
  iii) the third user agent transmitting an SIP INVITE to the first user agent to set up a new call; and
  iv) the third user agent and the first user agent continuing the parked session.

16. The mobility providing method in an SIP multimedia communication system as claimed in claim 15, further comprising the first user agent transmitting an SIP BYE message to the second user agent to finish a previous call set up between the first and second user agents between iii) and iv).

17. The mobility providing method in an SIP multimedia communication system as claimed in claim 15, wherein the SIP PUBLISH message includes information on the second user agent and the first user agent which is a peer of the session in progress.

18. The mobility providing method in an SIP multimedia communication system as claimed in claim 10, wherein the global domain includes a B2BUA (back-to-back user agent) that intervenes in a session between two users when a terminal is moved to carry out call control and media relay, and the method comprises:
  i) a first user agent located in a home network, executing a multimedia call session with a second user agent through the B2BUA;
  ii) transmitting an SIP Re-INVITE to the B2BUA when the first user agent is moved to a foreign network;
  iii) the B2BUA re-setting up a media route to the first user agent located in the foreign network; and
  iv) the B2BUA continuing the session between the first and second user agents.

19. The mobility providing method in an SIP multimedia communication system as claimed in claim 18, wherein i) comprises:
  the first user agent transmitting an SIP INVITE message to the B2BUA;
  the B2BUA transmitting the message received from the first user agent to the second user agent; and
  the B2BUA setting up a call between the first and second user agents to carry out a multimedia call session.

20. The mobility providing method in an SIP multimedia communication system as claimed in claim 18, wherein iv) comprises the B2BUA deleting a media route set up after the first user agent is moved.

* * * * *